United States Patent
Nakayama et al.

(10) Patent No.: US 10,135,049 B2
(45) Date of Patent: Nov. 20, 2018

(54) VEHICULAR LEAD STORAGE BATTERY AND VEHICLE EQUIPPED THEREWITH

(71) Applicants: GS Yuasa International Ltd., Kyoto-shi, Kyoto (JP); HONDA MOTOR CO., LTD., Tokyo (JP)

(72) Inventors: Yasuhide Nakayama, Kyoto (JP); Eiji Hojo, Kyoto (JP); Katsuhiro Ouchi, Wako (JP); Hidehiko Shibata, Wako (JP)

(73) Assignees: GS Yuasa International Ltd., Kyoto (JP); HONDA MOTOR CO., LTD., Tokyo (JP)

( * ) Notice: Subject to any disclaimer, the term of this patent is extended or adjusted under 35 U.S.C. 154(b) by 86 days.

(21) Appl. No.: 15/444,596

(22) Filed: Feb. 28, 2017

(65) Prior Publication Data

US 2017/0229695 A1 Aug. 10, 2017

Related U.S. Application Data

(62) Division of application No. 13/825,400, filed as application No. PCT/JP2011/078725 on Dec. 12, 2011.

(30) Foreign Application Priority Data

Dec. 13, 2010 (JP) .................................. 2010-276798

(51) Int. Cl.
*H01M 2/02* (2006.01)
*H01M 2/12* (2006.01)
(Continued)

(52) U.S. Cl.
CPC ......... *H01M 2/1252* (2013.01); *H01M 2/043* (2013.01); *H01M 10/12* (2013.01); *H01M 2220/20* (2013.01)

(58) Field of Classification Search
CPC .. H01M 2/043; H01M 2/1252; H01M 2/1247; H01M 10/12
See application file for complete search history.

(56) References Cited

U.S. PATENT DOCUMENTS

| 4,444,853 A | 4/1984 | Halsall et al. |
| 2003/0059669 A1 | 3/2003 | Mittal et al. |

FOREIGN PATENT DOCUMENTS

| CA | 2722554 | 10/2009 |
| CA | 2715265 | 4/2010 |

(Continued)

OTHER PUBLICATIONS

International Search Report filed in PCT/JP2011/078725, total 4 pages.

(Continued)

*Primary Examiner* — Stephen J Yanchuk
(74) *Attorney, Agent, or Firm* — Rankin, Hill & Clark LLP (57) ABSTRACT

A vehicular lead storage battery according to the present invention includes a battery container provided with at least one cell chamber; and a cover plate 1 for covering an upper opening of the battery container. A guide path 8 for discharging gases within a cell chamber to the outside is formed in the cover plate 1. The guide path 8 includes a first guide portion 9B for horizontally guiding gases from the cell chamber; a second guide portion 9C connected to the first guide portion 9B to downwardly guide the gases from the first guide portion 9B; and a third guide portion 10A connected to the second guide portion 9C to horizontally guide the gases from the second guide portion 9C and discharge the gases from an exhaust vent 4K formed in the cover plate 1 to the outside. A corner portion 9K is formed by the first guide portion 9B and the second guide portion 9C, and a corner portion 10K is formed by the second guide (Continued)

portion 9C and the third guide portion 10A. The guide path 8 is formed so that the angle $\theta$ of a straight line L having internal contact with the two corner portions 9K and 10K from a horizontal line is greater than the maximum angle of inclination at which the inclined angle of a vehicle is maximum during driving on a sloping ground.

1 Claim, 9 Drawing Sheets (51) Int. Cl.
      *H01M 10/12*    (2006.01)
      *H01M 2/04*    (2006.01)

(56) References Cited

FOREIGN PATENT DOCUMENTS

| | | |
|---|---|---|
| EP | 1298739 | 4/2003 |
| EP | 2320494 | 5/2011 |
| JP | 50-9061 | 1/1975 |
| JP | 4-36765 | 3/1992 |
| JP | 2003-109565 | 4/2003 |
| JP | 2004-243855 | 9/2004 |
| JP | 2009-43675 | 2/2009 |
| JP | 2010-44879 | 2/2010 |
| WO | 2010/016474 | 2/2010 |

OTHER PUBLICATIONS

International Preliminary report on patentability dated Jun. 27, 2013 issued in PCT/JP2011/078725 and English translation thereof.
Extended European Search Report dated May 24, 2016 issued in European patent application No. 11848387.4.

VEHICULAR LEAD STORAGE BATTERY AND VEHICLE EQUIPPED THEREWITH

FIELD OF THE INVENTION

The present invention relates to a vehicular lead storage battery including a battery container provided with at least one cell chamber; and a cover plate for covering an upper opening of the battery container. More particularly, the present invention relates to a vehicular lead storage battery in which a guide path for discharging gases within the cell chamber to the outside is formed in the cover plate. The present invention also relates to a vehicle equipped with this lead storage battery.

RELATED ART

The above-described vehicular lead storage battery is provided with an exhaust vent for discharging gases generated inside the cell chamber to the outside; and a guide path for guiding the gases generated inside the cell chamber to the exhaust vent. The guide path includes an upward guide portion for upwardly moving gases from the cell chamber; a first guide portion for horizontally moving the gases guided by the upward guide portion; a second guide portion for downwardly moving the gases guided by the first guide portion; and a third guide portion for horizontally moving the gases guided by the second guide portion to discharge the gases from the exhaust vent to the outside (see, for example, Patent Document 1).

Incidentally, a vehicular lead storage battery is mounted on various types of vehicles. For example, the vehicular lead storage battery is mounted on an irregular-terrain four-wheel vehicle referred to as an ATV (All Terrain Vehicle) which is one type of four-wheel buggy. This type of vehicle may in some cases drive along a rough road with puddles of muddy water with the body of the vehicle inclined. Accordingly, in a conventional vehicular lead storage battery, muddy water splashed during driving may go into a guide path from an exhaust vent.

Figure 9A:
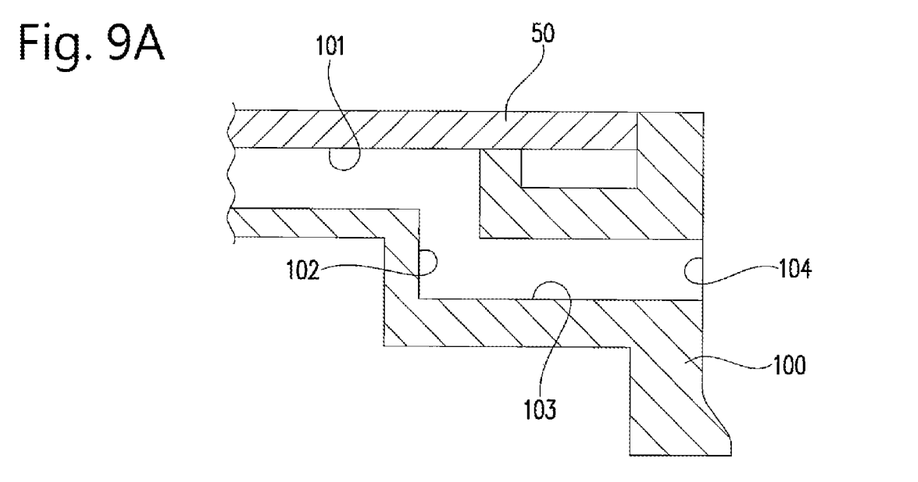
Figure 9B:
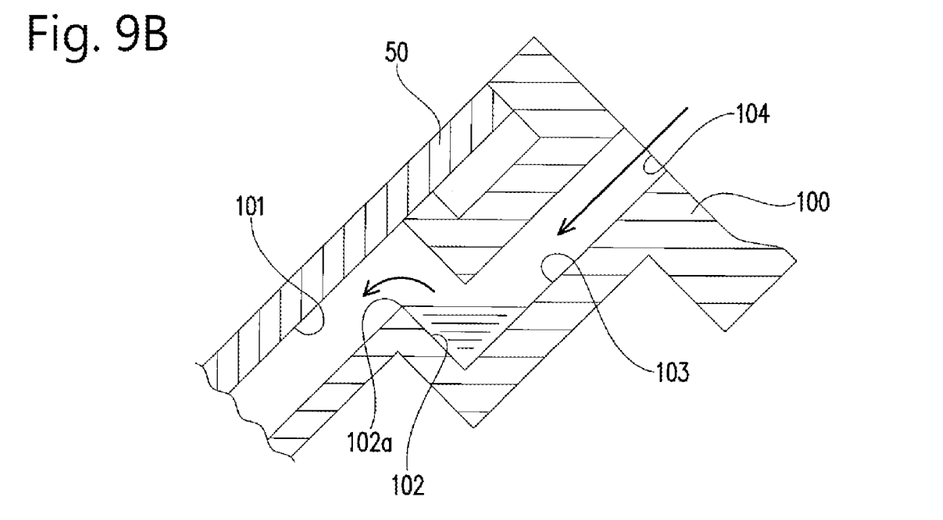

Here, a specific example will be described. FIG. 9A illustrates a horizontally-positioned vehicular lead storage battery, whereas FIG. 9B illustrates the vehicular lead storage battery inclined 45° from the horizontal position. A guide path shown in each of FIGS. 9A and 9B is formed by a cover plate 100 for covering an upper opening of a battery container, and an upper cover 50 for closing an upper end of the cover plate 100. The guide path includes a first guide portion 101 for horizontally moving gases from the cell chamber; a second guide portion 102 for downwardly moving the gases guided by the first guide portion 101; and a third guide portion 103 for horizontally moving the gases guided by the second guide portion 102 to discharge the gases from the exhaust vent 104 to the outside.

If a vehicle runs in an inclined state, the vehicular lead storage battery mounted on the vehicle is also placed in an inclined state. If muddy water passes through the exhaust vent 104 into the guide path under this condition, the muddy water moves from the third guide portion 103 to the second guide portion 102, as illustrated in FIG. 9B. As the vehicle inclines further, the muddy water goes beyond an upper end 102a of inner walls constituting the second guide portion 102, depending on the amount of muddy water having entered the guide path, and moves into the first guide portion 101. As a result, in the case of a conventional vehicular lead storage battery, the muddy water may reach as far as to an exhaust opening located between the guide path and the cell chamber. In addition, the conventional vehicular lead storage battery is small in the allowable amount of accumulation at which the muddy water can be accumulated inside the guide path. Thus, the conventional vehicular lead storage battery cannot reliably prevent the intrusion of muddy water into the exhaust opening.

CITATION LIST

Patent Document

Patent Document 1: Japanese Patent Application Laid-Open No. 2010-44879

DISCLOSURE OF THE INVENTION

Problems to be Solved by the Invention

Hence, in view of such problems as described above, an object of the present invention is to provide a vehicular lead storage battery including a guide path having high watertight effects and a vehicle equipped with this vehicular lead storage battery.

Means for Solving Problems

A vehicular lead storage battery according to the present invention includes:

a battery container in which an upper opening is formed and which is provided with at least one cell chamber; and a cover plate in which an exhaust vent is formed and which covers the upper opening of the battery container, wherein a guide path for discharging gases inside the cell chamber to the outside is formed in the cover plate, the guide path including:

a first guide portion for horizontally guiding gases from the cell chamber;

a second guide portion connected to the first guide portion to downwardly guide the gases from the first guide portion; and a third guide portion connected to the second guide portion to horizontally guide the gases from the second guide portion and discharge the gases from an exhaust vent to the outside, a corner portion is formed by the first guide portion and the second guide portion, another corner portion is formed by the second guide portion and the third guide portion, and the guide path is formed so that the angle of a straight line having internal contact with the two corner portions from a horizontal line is greater than the maximum angle of inclination at which the inclined angle of a vehicle is maximum during driving on a sloping ground.

Here, the vehicular lead storage battery according to one aspect of the present invention may have a configuration in which: the third guide portion is formed so that a bottom wall constituting the third guide portion is present on an extended line of the straight line extending toward the third guide portion side.

The vehicular lead storage battery according to still another aspect of the present invention may have a configuration in which: the upper limit of the angle of the straight line from the horizontal line is set so as to be less than 90°.

The vehicular lead storage battery according to yet another aspect of the present invention may have a configuration in which: the battery container includes a plurality of cell chambers, and the cover plate includes exhaust openings for respectively discharging gases from the plurality of cell chambers; a space for collecting the gases discharged from the plurality of exhaust openings in a specific cell chamber; and a second exhaust opening for capturing the gases collected in the specific cell chamber into the guide path.

The vehicular lead storage battery according to another aspect of the present invention may have a configuration in which: the cover plate is formed into a rectangular shape in plan view having long sides and short sides, and the first guide portion includes a first-direction guide portion extending toward one side of the direction in which the long sides of the cover plate extend; a curved guide portion formed so as to curve from the terminal end of the guiding direction of the first-direction guide portion toward one side of the direction in which the short sides of the cover plate extend; and a second-direction guide portion further extending from the terminal end of the guiding direction of the curved guide portion toward one side of the direction in which the long sides of the cover plate extend.

In this case, the vehicular lead storage battery can be configured so that the battery container includes a plurality of cell chambers, the cover plate includes exhaust openings for respectively discharging gases from the plurality of cell chambers, and the curved guide portion is formed so as to curve along the exhaust openings.

The vehicular lead storage battery according to still another aspect of the present invention may have a configuration in which: the third guide portion is formed into a taper shape in which the third guide portion decreases in diameter as the distance thereof from the exhaust vent increases.

The vehicular lead storage battery according to yet another aspect of the present invention may have a configuration in which: a plurality of protrusions projecting from an external surface of the cover plate are radially disposed at predetermined intervals in a circumferential direction and a cutout is formed between adjacent protrusions in the exhaust vent, and the cutout is oriented in a direction in which the vehicular lead storage battery inclines when mounted on a vehicle with a surface formed of opposed two sides of the vehicular lead storage battery positioned substantially level or horizontal.

In this case, the vehicular lead storage battery can be configured so that the cover plate includes a side surface having an exhaust vent, a side surface of the cover plate below the exhaust vent swelling outward from the side surface having the exhaust vent; and a continuous inclined surface between an upper end portion of the swelled side surface and a lower end portion of the side surface having the exhaust vent.

According to the present invention, there is also provided a vehicle equipped with a vehicular lead storage battery including any one of the above-described vehicular lead storage batteries.

BRIEF DESCRIPTION OF THE DRAWINGS

FIG. 4A is a plan view illustrating the periphery of a second exhaust opening, wherein

FIGS. 5A and 5B are vertical cross-sectional views of the cover plate illustrating an exhaust vent-side portion of the guide path, wherein FIG. 5A shows a state in which the cover plate is level or horizontal and FIG. 5B shows a state in which the cover plate is inclined 45°.

FIG. 6A is a plan view illustrating the periphery of the second exhaust opening, whereas

FIGS. 7A, 7B and 7C illustrate the upper cover, wherein FIG. 7A is a plan view thereof, FIG. 7B is a bottom view thereof, and FIG. 7C is a cross-sectional view taken along the line C-C in FIG. 7B.

FIGS. 9A and 9B are vertical cross-sectional views of a conventional cover plate illustrating an exhaust vent-side portion of the guide path, wherein FIG. 9A shows a state in which the cover plate is level or horizontal and FIG. 9B shows a state in which the cover plate is inclined 45°.

DESCRIPTION OF EMBODIMENTS

Hereinafter, one embodiment of a vehicular lead storage battery according to the present invention will be described. First, a description will be given of a brief overview of the vehicular lead storage battery according to the present embodiment.

The vehicular lead storage battery according to the present embodiment includes:

a battery container in which an upper opening is formed and which is provided with at least one cell chamber; and a cover plate in which an exhaust vent is formed and which covers the upper opening of the battery container.

In the vehicular lead storage battery according to the present embodiment, a guide path for discharging gases inside the cell chamber to the outside is formed in the cover plate.

The guide path includes:

a first guide portion for horizontally guiding gases from the cell chamber;

a second guide portion connected to the first guide portion to downwardly guide the gases from the first guide portion; and a third guide portion connected to the second guide portion to horizontally guide the gases from the second guide portion and discharge the gases from an exhaust vent to the outside, In the vehicular lead storage battery according to the present embodiment, a corner portion is formed by the first guide portion and the second guide portion, and another corner portion is formed by the second guide portion and the third guide portion.

In the vehicular lead storage battery according to the present embodiment, the guide path is formed so that the angle of a straight line having internal contact with the two corner portions from a horizontal line is greater than the maximum angle of inclination at which the inclined angle of a vehicle is maximum during driving on a sloping ground.

According to the vehicular lead storage battery in accordance with the present embodiment, when, for example, a vehicle drives along a rough road with puddles of muddy water, temporarily or during a predetermined time, in a state of being inclined, splashed muddy water may go into the guide path from the exhaust vent. Even if the muddy water goes into the guide path, however, the path of the second guide portion itself retains the muddy water if the amount of incoming muddy water is small, thereby preventing the muddy water from intruding inside the battery. If the amount of incoming muddy water is large, the muddy water abuts against the two corner portions. Consequently, the guide path is shut off at a location from the first guide portion to the third guide portion. This shutoff makes it difficult for air and the muddy water to replace each other on the first guide portion side (the muddy water does not intrude inside the battery through the first guide portion), thereby preventing the intrusion of the muddy water. Accordingly, the muddy water is prevented from intruding into the first guide portion side, irrespective of the amount of incoming muddy water.

In addition, the intrusion of the muddy water is prevented until the inclined angle of a vehicle driving on a sloping ground is greater than the maximum angle of inclination. Consequently, even if the inclined angle of the vehicle driving on a sloping ground is the maximum angle of inclination, the vehicular lead storage battery can prevent the muddy water from intruding inside.

As one aspect of the vehicular lead storage battery according to the present embodiment, the third guide portion can be formed so that a bottom wall constituting the third guide portion is present on an extended line of the straight line extending toward the third guide portion side.

As another aspect of the vehicular lead storage battery according to the present embodiment, the upper limit of the angle of the straight line having internal contact with the two corner portions from a horizontal line can be set so as to be less than 90°.

As yet another aspect of the vehicular lead storage battery according to the present embodiment, the vehicular lead storage battery can be configured so that the battery container includes a plurality of cell chambers, and the cover plate includes exhaust openings for respectively discharging gases from the plurality of cell chambers; a space for collecting the gases discharged from the plurality of exhaust openings in a specific cell chamber; and a second exhaust opening for capturing the gases collected in the specific cell chamber into the guide path.

According to this vehicular lead storage battery, gases discharged from the plurality of exhaust openings are collected in a specific cell chamber and discharged from the second exhaust opening to the outside. By adopting a collective exhaust system as described above, the battery has the advantage of, for example, being able to reduce the number of components, compared with a battery which adopts an individual exhaust system in which all of the plurality of exhaust openings are provided with filters.

As yet another aspect of the vehicular lead storage battery according to the present embodiment, the vehicular lead storage battery can be configured so that the cover plate is formed into a rectangular shape in plan view having long sides and short sides, and the first guide portion includes a first-direction guide portion extending toward one side of the direction in which the long sides of the cover plate extend; a curved guide portion formed so as to curve from the terminal end of the guiding direction of the first-direction guide portion toward one side of the direction in which the short sides of the cover plate extend; and a second-direction guide portion further extending from the terminal end of the guiding direction of the curved guide portion toward one side of the direction in which the long sides of the cover plate extend.

According to such a vehicular lead storage battery as described above, the length of the first guide portion can be increased by providing the first guide portion with three guide portions. Thus, it is possible to more reliably prevent the intrusion of muddy water or the like. In addition, curving the guide portion enables the first guide portion to be provided around the exhaust opening in a compact manner, while lengthening the guide path of the first guide portion.

As yet another aspect of the vehicular lead storage battery according to the present embodiment, the vehicular lead storage battery can be configured so that the battery container includes a plurality of cell chambers, the cover plate includes exhaust openings for respectively discharging gases from the plurality of cell chambers, and the curved guide portion is formed so as to curve along the exhaust openings.

As yet another aspect of the vehicular lead storage battery according to the present embodiment, the third guide portion can be formed into a taper shape in which the third guide portion decreases in diameter as the distance thereof from the exhaust vent increases.

According to this vehicular lead storage battery, the third guide portion is formed into a taper shape in which the third guide portion decreases in diameter as the distance thereof from the exhaust vent increases. That is, the third guide portion is formed into a taper shape in which the third guide portion increases in diameter as the distance thereof from the exhaust vent decreases. Consequently, even if muddy water or the like intrudes from the exhaust vent, the taper shape makes it easy to discharge the muddy water or the like out of the exhaust vent, thus contributing to enhancing watertight effects.

As yet another aspect of the vehicular lead storage battery according to the present embodiment, the vehicular lead storage battery may be configured so that a plurality of protrusions projecting from an external surface of the cover plate are radially disposed at predetermined intervals in a circumferential direction in the exhaust vent, a cutout is formed between adjacent protrusions, and the cutout is oriented in a direction in which the vehicular lead storage battery inclines when mounted on a vehicle with a surface formed of opposed two sides of the vehicular lead storage battery positioned substantially level or horizontal.

According to this vehicular lead storage battery, the cutout is oriented in a direction in which the vehicular lead storage battery inclines. Consequently, the cutout does not face directly upward with the battery mounted no matter whether the battery is mounted in an upright position or a lateral position. Thus, muddy water or the like is prevented from intruding inside from the cutout.

As yet another aspect of the vehicular lead storage battery according to the present embodiment, the vehicular lead storage battery can be configured so that the cover plate includes a side surface having an exhaust vent, a side surface of the cover plate below the exhaust vent swelling outward from the side surface including the exhaust vent; and a continuous inclined surface between an upper end portion of the swelled side surface and a lower end portion of the side surface including the exhaust vent.

According to this vehicular lead storage battery, the cover plate includes the continuous inclined surface between an upper end portion of the swelled side surface and a lower end portion of the side surface including the exhaust vent. Consequently, dirt or the like is less likely to adhere to side surfaces of the cover plate in the vicinity of the exhaust vent, compared with a case in which, for example, a step is provided between the upper end portion of the swelled side surface and the lower end portion of the side surface including the exhaust vent. That is, the battery can be configured so that dirt or the like is less likely to adhere to the side surface between the upper end portion of the swelled side surface and the lower end portion of the side surface including the exhaust vent. Thus, the exhaust vent can be maintained in a favorable condition.

As described above, according to the vehicular lead storage battery in accordance with the present embodiment, it is possible to enhance the watertight effects of the guide path.

Next, the vehicular lead storage battery according to the present embodiment will be described in detail, while referring to FIGS. 1 to 8.

Figure 8:
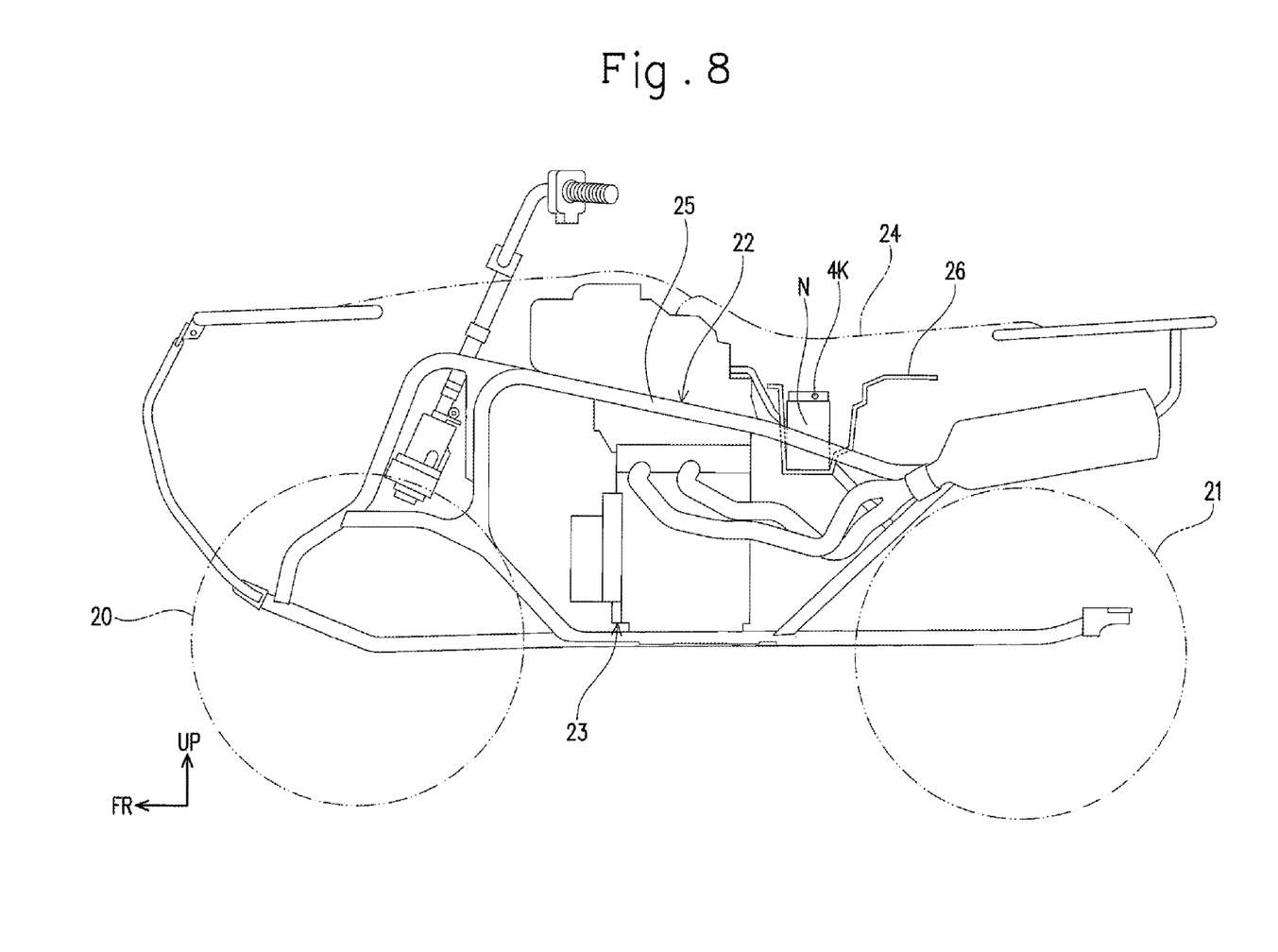
FIG. 8 is a side view of an irregular-terrain four-wheel vehicle mounted with a vehicular lead storage battery according to one embodiment of the present invention.

FIG. 8 illustrates an irregular-terrain four-wheel vehicle mounted with a vehicular lead storage battery N according to the present embodiment. In the following description given to the irregular-terrain four-wheel vehicle illustrated in FIG. 8, orientations as represented by the terms "rear," "front," "right" and "left," unless otherwise referred to, mean orientations corresponding to the orientations of a vehicle based on the driving direction thereof. That is, "rear" and "front" refer to orientations corresponding to the front and rear sides of the vehicle in the driving direction, whereas "right" and "left" refers to orientations corresponding to the right and left sides (width direction) of the vehicle facing the driving direction. In addition, an arrow FR in the figure denotes the front side of the vehicle, whereas an arrow UP in the figure denotes the upside of the vehicle. Note that the vehicle mounted with the vehicular lead storage battery N according to the present embodiment is not limited to an irregular-terrain four-wheel vehicle, but may be a saddle-ride type vehicle, such as a two-wheel motor vehicle.

The irregular-terrain four-wheel vehicle is equipped with a vehicle body reduced in size and weight; and front wheels 20 and rear wheels 21 which are low-pressure balloon tires relatively large in diameter provided in the rear, front, right and left positions of the vehicle body. Consequently, the irregular-terrain four-wheel vehicle is constructed as a so-called ATV (All Terrain Vehicle) in which a large minimum ground clearance is secured and the running-through performance of which in irregular terrains is enhanced.

The irregular-terrain four-wheel vehicle includes a body frame 22; an independent front suspension (not illustrated) supported at the front of the body frame 22; and an independent rear suspension (not illustrated) supported at the rear of the body frame 22. The body frame 22 forms an anteroposteriorly elongated box structure at the central part thereof in the vehicle width direction (right-left direction). The body frame 22 includes upper frames 25 on the right and left sides thereof. The irregular-terrain four-wheel vehicle includes a housing box 26 supported by the upper frames 25.

In addition, the irregular-terrain four-wheel vehicle is equipped with an engine (internal-combustion engine) 23 located at a substantially central part of the body frame 22 and serving as a motor of the vehicle; and a seat 24 which is located at the substantially central part of the body frame 22 and backward from the engine 23 and on which a driver sits.

The vehicular lead storage battery N is mounted underneath the seat 24. The vehicular lead storage battery N is contained in the housing box 26. The housing box 26 is formed into an upwardly-open box shape.

Figure 1:
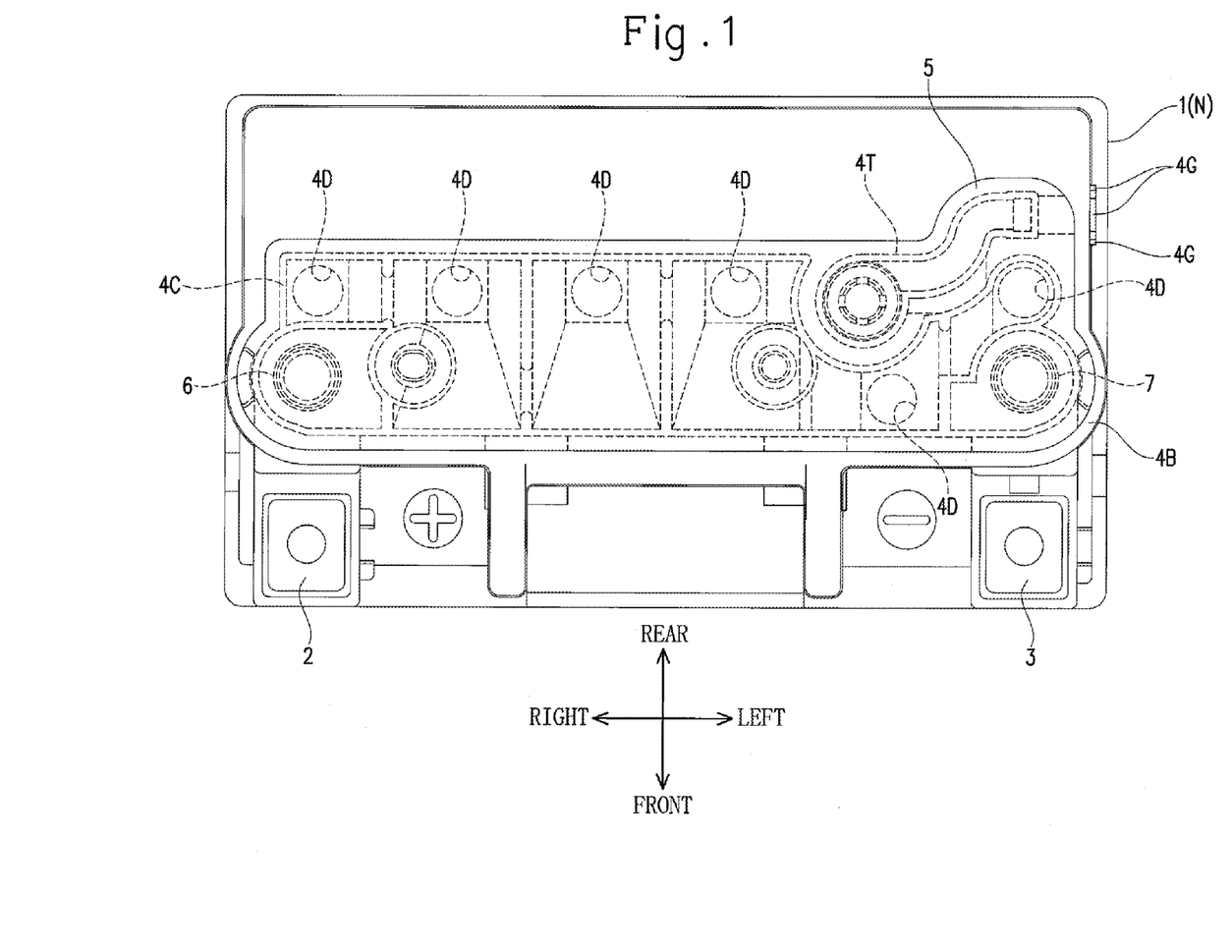
FIG. 1 is a plan view of a cover plate to which an upper cover constituting a vehicular lead storage battery according to one embodiment of the present invention is attached.
Figure 2:
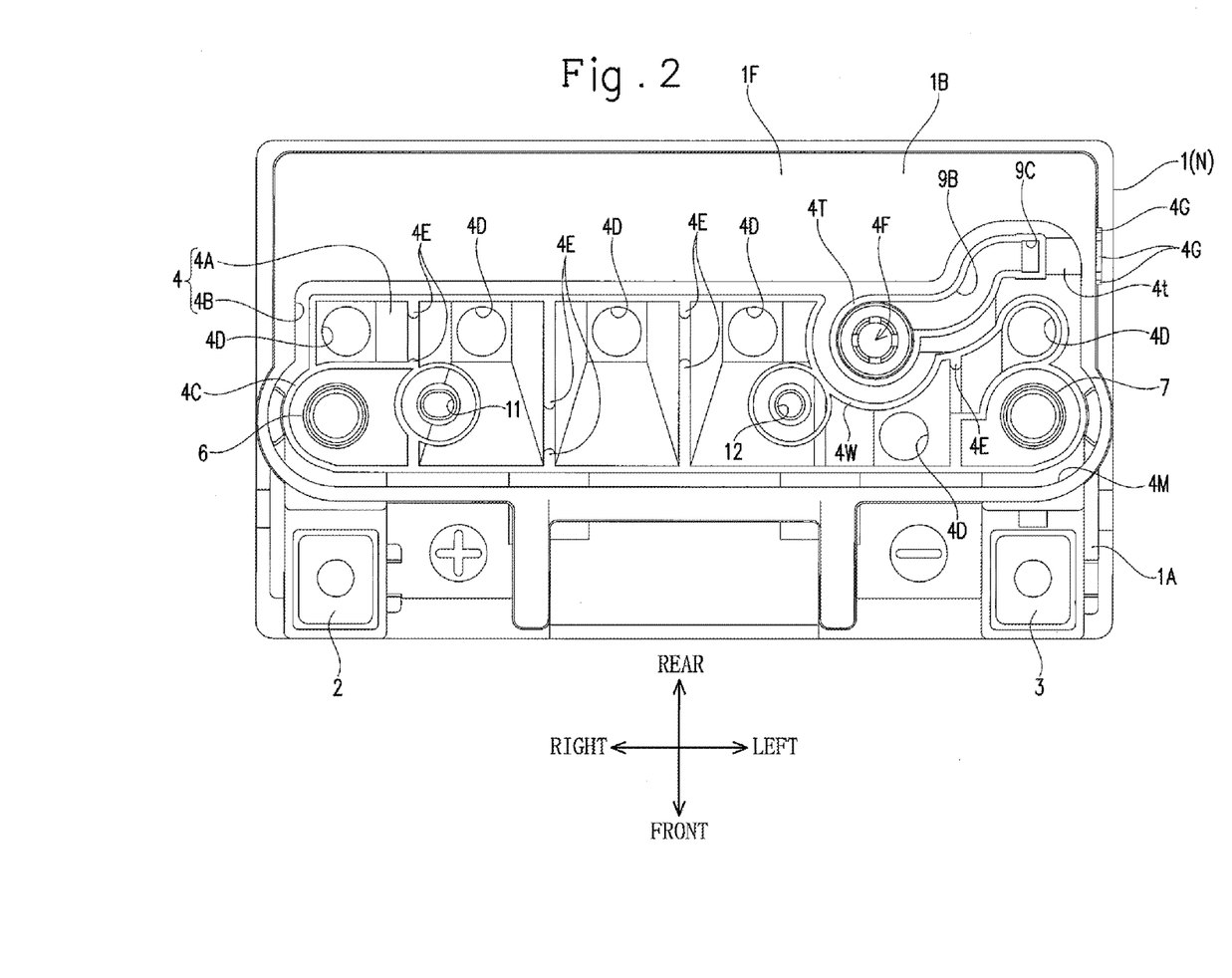
FIG. 2 is a plan view of the cover plate before the upper cover illustrated in FIG. 1 is attached.
Figure 3:
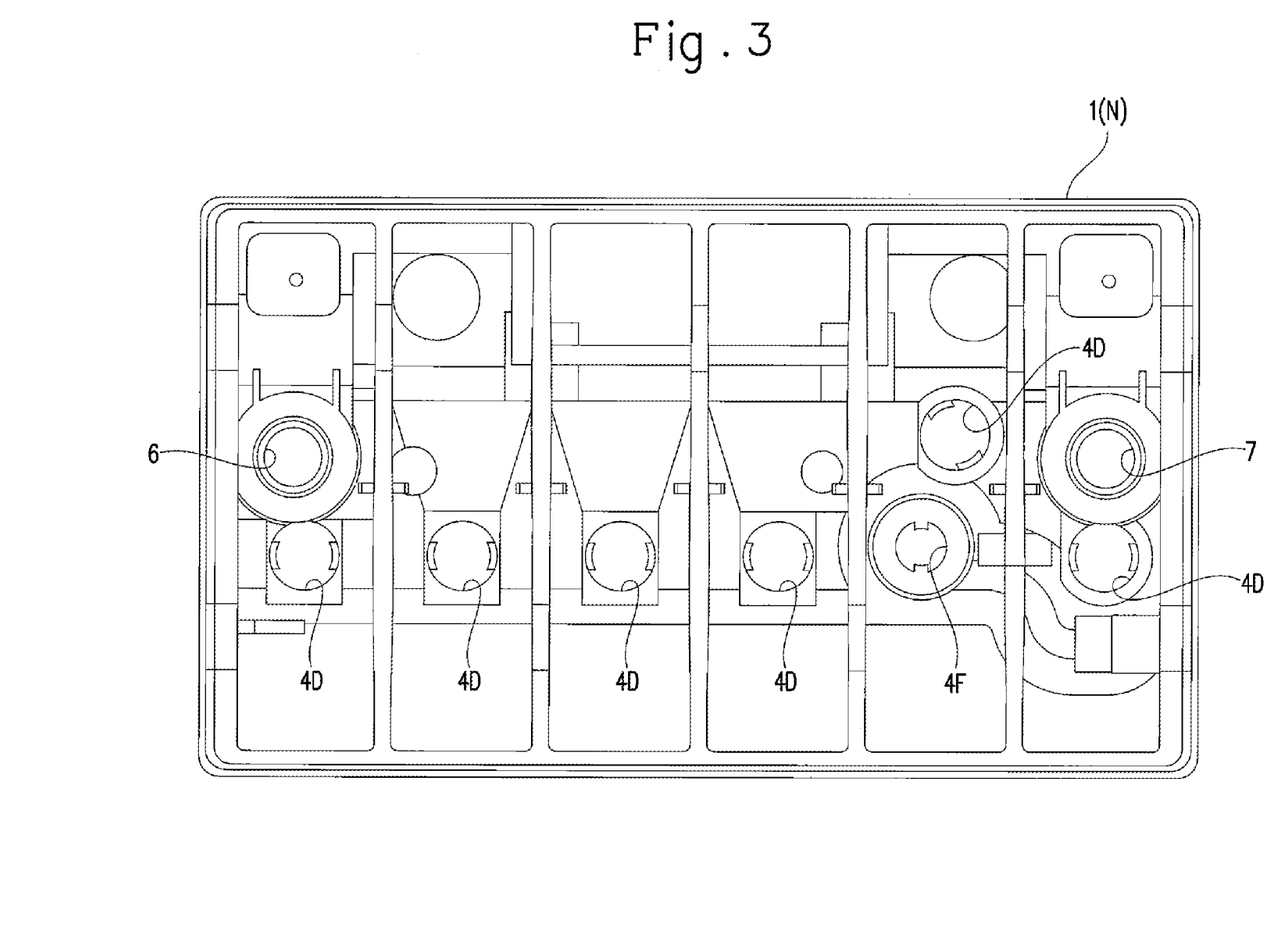
FIG. 3 is a bottom view of the cover plate illustrated in FIG. 1.

The vehicular lead storage battery N is provided with a battery container (not illustrated) having an upper opening and including a plurality of cell chambers into which the battery container is partitioned; and a cover plate 1 (see FIGS. 1 to 3). In addition, the vehicular lead storage battery N includes a pair of terminals 2 and 3 (see FIGS. 1 and 2). The vehicular lead storage battery N (the cover plate 1 and the battery container) is formed into a rectangular shape in plan view. The vehicular lead storage battery N is placed in the housing box 26, so that the longitudinal direction of the battery coincides with the width direction of the vehicle body. In addition, the vehicular lead storage battery N is positioned so that when the battery is mounted on the vehicle, a later-described exhaust vent 4K faces to the left in the vehicle width direction (one side of the vehicle in a direction orthogonal to the driving direction).

FIGS. 1 to 3 illustrate the cover plate 1 of the vehicular lead storage battery N. FIG. 1 illustrates a state of the battery to which a later-described upper cover 5 is attached, FIG. 2 illustrates a state of the battery before the later-described upper cover 5 is attached, and FIG. 3 illustrates a state of the cover plate 1 when viewed from inside.

The cover plate 1 is formed from synthetic resin. The cover plate 1 is formed into a rectangular shape in plan view having long sides (a pair of long sides) and short sides (a pair of short sides). The cover plate 1 is used to cover the upper opening of the battery container. The vehicular lead storage battery (provided with the cover plate 1 according to the present embodiment) N according to the present embodiment is suited for mounting on such vehicles as two-wheel motor vehicles and automobiles. The vehicular lead storage battery N is likewise suited for mounting on an irregular-terrain four-wheel vehicle, among the abovementioned vehicles, which is one type of four-wheel buggy referred to as an ATV (All Terrain Vehicle). Note that arrows in FIGS. 1 and 2 show the rear, front, right and left sides of the cover plate 1 with respect to an irregular-terrain four-wheel vehicle when the vehicular lead storage battery N is mounted thereon. In addition, in FIGS. 1 and 2, an upper-side arrow of the two arrows extending in the vertical direction represents a direction corresponding to the rear side of the irregular-terrain four-wheel vehicle in the driving direction, whereas a lower-side arrow of the two arrows extending in the vertical direction represents a direction corresponding to the front side of the irregular-terrain four-wheel vehicle in the driving direction. Also in FIGS. 1 and 2, a left-side arrow of the two arrows extending in the right-left direction represents a direction corresponding to the right side of the irregular-terrain four-wheel vehicle in the driving direction, whereas a right-side arrow of the two arrows extending in the right-left direction represents a direction corresponding to the left side of the irregular-terrain four-wheel vehicle in the driving direction.

The cover plate 1 includes a first cover portion 1A in which the pair of terminals 2 and 3 is disposed at both ends of one of the long sides (anteroposteriorly front-edge side) in the extending direction thereof (right-left direction); and a second cover portion 1B having an upper surface higher than the upper surface of the first cover portion 1A. A downwardly extending recessed portion 4 is formed on the upper surface of the second cover portion 1B.

The recessed portion 4 is formed through to a position slightly closer to the rear side from a position, which is the halfway point of the upper surface of the second cover portion 1B in a direction in which the short sides of the cover plate 1 extend from the first cover portion 1A (front-back direction). Thus, the recessed portion 4 is formed over a wide area. In addition, the cover plate 1 includes a flat surface 1F having no recessed portions 4 at the other one of the long sides (anteroposteriorly rear-edge side). The flat surface 1F can be utilized as a space where a seal or the like on which a model number or the like is written is attached. Note that in the present embodiment, the terminal 2 on the left in the figure is a positive electrode terminal and the terminal 3 on the right in the figure is a negative electrode terminal.

The recessed portion 4 includes a bottom wall 4A forming the bottom portion thereof; and a vertical wall 4B raised upward from the outer periphery of the bottom wall 4A. In addition, the cover plate 1 includes an upward-protruding annular projecting portion 4C. The projecting portion 4C is located in a portion of the bottom wall 4A positioned on the inner side of the vertical wall 4B inside the recessed portion 4. The upper surface of the projecting portion 4C is lower than the vertical wall 4B. The upper surface of the projecting portion 4C may be level with the vertical wall 4B, however. This way of configuration is intended to allow the outer periphery 5G of the upper cover 5 to cover a groove portion 4M and the upper surface of the upper cover 5 and the flat surface 1F of the cover plate 1 to be positioned substantially flush with each other, when the lower end of a junctional portion 5C of the upper cover 5 and the projecting portion 4C of the cover plate 1 are fused and integrated with each other, as will be described later.

The recessed portion 4 further includes exhaust openings 4D for respectively discharging gases from a plurality of (six in the figure) cell chambers. The exhaust openings 4D are provided in the bottom wall 4A on the inner side of the projecting portion 4C. By way of making descriptions while also referring to FIGS. 7A, 7B and 7C, the vehicular lead storage battery N includes an upper cover 5 for closing the inner side of the projecting portion 4C, in order to form a space for collecting gases discharged from the plurality of exhaust openings 4D in a specific cell chamber. The projecting portion 4C is structured into a substantially rectangular shape in plan view in FIG. 2. The projecting portion 4C includes a curved section 4W inside which a portion in which a later-described second exhaust opening 4F is formed is positioned, so as to be able to circumvent the second exhaust opening 4F. In addition, the bottom wall 4A is formed into an inclined surface which lowers as the wall becomes closer toward the exhaust opening 4D. Consequently, the bottom wall 4A functions as a guide surface capable of putting back an electrolytic solution escaping from each exhaust opening 4D to its corresponding exhaust opening 4D side. Yet additionally, the cover plate 1 includes extending portions 4E extending inward from a position where the rear and front sides of the projecting portion 4C are opposed to each other to form a gap positioned between respective adjacent exhaust openings 4D. The extending portions 4E allow only the gases discharged from the exhaust openings 4D to freely move inside the projecting portion 4C, and can prevent an electrolytic solution escaping from the exhaust openings 4D from moving to any abutting other exhaust openings 4D. Note that in FIG. 2, only the extending portion 4E extending inward from the other one of the long sides of the cover plate 1 is provided on one side (right-edge side in the figure) of a direction in which the long sides of the cover plate 1 extend.

In addition, cylindrical bushings 6 and 7 are embedded in the recessed portion 4. The bushings 6 and 7 are provided in a pair on the right and left sides. Electrode poles (not illustrated) extending from the battery container and used to derive electric power are inserted in the bushings 6 and 7 and welded thereto. The bushings 6 and 7 are coupled with the lower sides of the terminals 2 and 3 in a horizontal direction disposed in parallel with the bushings 6 and 7 by conductive parts (not illustrated). More particularly, the terminals 2 and 3, the bushings 6 and 7, and the conductive parts are integrally molded using lead or lead alloy, thereby forming terminal parts. Consequently, the conductive parts are embedded in the cover plate 1.

The upper cover 5 is formed from synthetic resin. The upper cover 5 is the same in external shape and size as the projecting portion 4C (see FIG. 1). The upper cover 5 includes the junctional portion 5C joined to the projecting portion 4C; and an outer periphery 5G covering an annular groove portion 4M (see FIG. 2) formed between the projecting portion 4C and the vertical wall 4B (see FIG. 2). The upper cover 5 is made conformal to the projecting portion 4C of the recessed portion 4 after placing the lower end of the junctional portion 5C in a molten state. Consequently, the upper cover 5 (junctional portion 5C) and the recessed portion 4 (projecting portion 4C) are fused to integrate with each other. The cover plate 1 is provided with a porous filter and a valve (not illustrated) located in the second exhaust opening 4F for the purpose of protection against explosion, prevention of gas backflow from the outside, and regulation of internal pressure. Note that the junctional portion 5C includes portions corresponding to pairs of extending portions 4E provided in four places of the projecting portion 4C. Accordingly, the junctional portion 5C is defined as including the portions thereof corresponding to the pairs of extending portions 4E.

The materials of the cover plate 1 and the upper cover 5 are preferably thermoplastic resin, such as polypropylene resin. The materials of the cover plate 1 and the upper cover 5 may be any other synthetic resin, however. Note that the materials of both covers are preferably the same when the upper cover 5 is thermally fused to the cover plate 1.

FIGS. 4A, 4B, 4C, 5A, 5B, 6A, and 6B illustrate characterizing portions of the present embodiment. The recessed portion 4 includes the bottom wall 4A in which the second exhaust opening 4F different from the exhaust openings (exhaust holes for discharging gases from the cell chambers) 4D formed in the bottom wall 4A and communicated with the exhaust openings 4D is formed. The second exhaust opening 4F is provided in a portion of the bottom wall 4A in which the exhaust opening 4D fifth from left in the figure is formed. In addition, a guide path 8 circumventing the groove portion 4M therebelow is formed in the bottom wall 4A. The guide path 8 collects gases from other cell chambers into the cell chamber (specific cell chamber) in which the second exhaust opening 4F is provided, through the exhaust opening 4D, and guides the gases from the second exhaust opening 4F to the outside. Note that the specific cell chamber may not be located in the abovementioned place. That is, the guide path 8 is composed of a first guide path 9 and a second guide path 10. The first guide path 9 is formed by joining together an annular junctional portion 5T (see FIG. 7B) projecting downward in the bottom surface of the upper cover 5 and a projecting portion 4T projecting from the bottom wall 4A so as to conform to the junctional portion 5T. The second guide path 10 is formed into a tunnel-like shape by utilizing a projecting portion 4t forming a part of the groove portion 4M from an end of the first guide path 9 to the exhaust vent 4K formed on the right side end of the vertical wall 4B and a part of the vertical wall 4B.

Figure 4A:
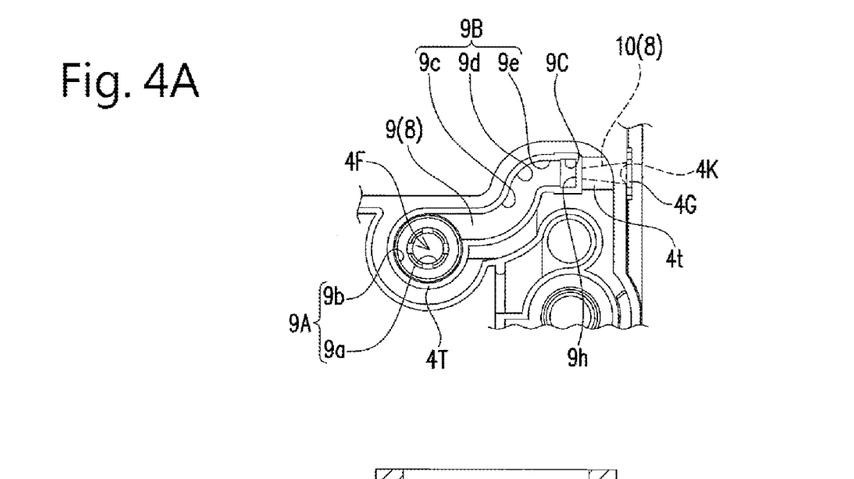
Figure 4B:
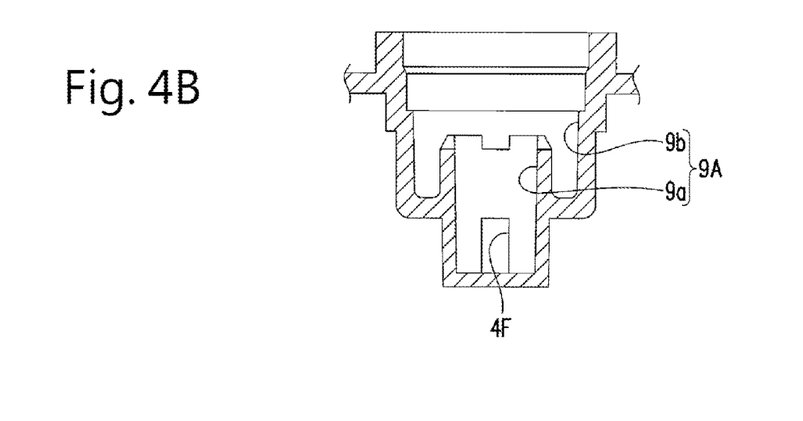
FIG. 4B is a vertical cross section of the second exhaust opening and FIG. 4C is a schematic view of a guide path.
Figure 4C:
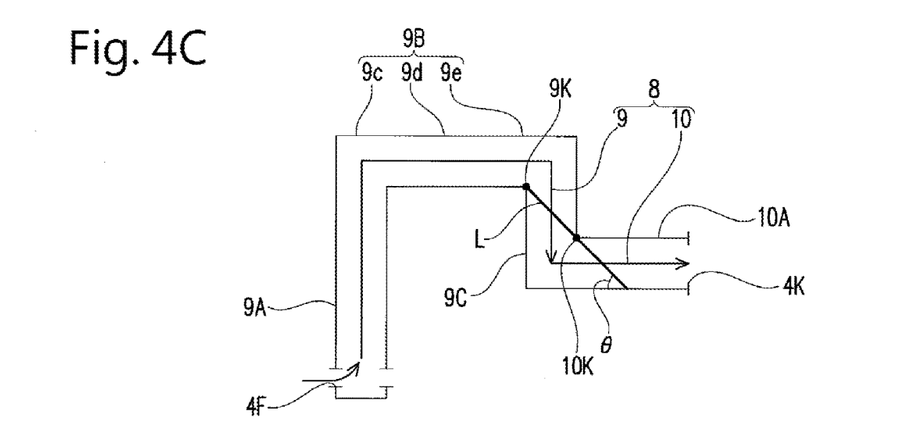

The first guide path 9 is formed of an upward guide portion 9A for upwardly moving gases from the second exhaust opening 4F; a first guide portion 9B for horizontally moving the gases from the upward guide portion 9A; and a second guide portion 9C for downwardly moving the gases from the first guide portion 9B. The first guide path 9 is adapted to receive the gases from second guide portion 9C to pass the gases to the second guide path 10.

The upward guide portion 9A includes a first upward guide portion 9a having a cylindrical shape for upwardly moving gases from the second exhaust opening 4F to a predetermined height; and a cylindrical second upward guide portion 9b having a larger diameter than the first upward guide portion 9a, in order to guide the gases from the first upward guide portion 9a upward further.

The first guide portion 9B includes a first-direction guide portion 9c for moving gases to one side (right side in FIG. 4A) of a direction in which the long sides of the cover plate 1 extend (width direction (right-left direction in the figure)); a curved guide portion 9d for curvilinearly guiding the gases guided to the terminal end of the guiding direction of the first-direction guide portion 9c obliquely backward (to one side of a direction intersecting with the direction in which the long sides of the cover plate 1 extend); and a second-direction guide portion 9e for once again moving the gases guided to the terminal end of the guiding direction of the curved guide portion 9d to one side (right side in FIG. 4A) of a direction in which the long sides of the cover plate 1 extend (width direction (right-left direction in the figure)). As described above, the first guide portion 9B is lengthened by including the three guide portions 9c, 9d and 9e. Consequently, it is possible to further prevent the intrusion of muddy water or the like. In addition, since the first guide portion 9B is curved, it is possible to provide the first guide portion 9B around the exhaust opening 4D in a compact manner, while lengthening the guide path.

Incidentally, when the vehicular lead storage battery is used with the battery mounted on an automobile, gases from the second exhaust opening 4F move through the upward guide portion 9A, the first guide portion 9B, the second guide portion 9C, and the second guide path 10 and are discharged from the exhaust vent 4K.

In the second guide path 10, the exhaust vent 4K is formed in the right end portion of the vertical wall 4B in the figure by inserting a rod (rod for creating holes) in a metal mold. In addition, a third guide portion 10A composed of a tunnel-like through hole is formed to extend from the vertical wall 4B to a wall 9h of the second guide portion 9C on the right in the figure. The third guide portion 10A is formed in a direction away from the first guide portion 9B.

By way of detailedly describing the first guide path 9 and the second guide path 10, a corner portion 9K is formed by the first guide portion 9B and the second guide portion 9C. Likewise, a corner portion 10K is formed by the second guide portion 9C and the third guide portion 10A. The guide paths 9 and 10 are formed so that the angle θ of a straight line L having internal contact with the two corner portions 9K and 10K from a horizontal line is 45°. Note that the angle θ of the straight line L from the horizontal line is not limited to 45°. The angle θ of the straight line L from the horizontal line is preferably set so as to be greater than the limited angle of inclination (for example, 42°) of a vehicle body at which an irregular-terrain four-wheel vehicle can drive. Note that the limited angle of inclination of the vehicle body is an angle to be set on a vehicle-by-vehicle basis.

Here, the angle θ of the straight line L from the horizontal line is set so as to be greater than the limited angle of inclination of the vehicle body. It is unlikely, however, that the frequency and the possibility of the vehicle driving with the vehicle body at the limited angle of inclination are low. Accordingly, the angle θ of the straight line L from the horizontal line may be set to any values as long as the angle is a value greater than the maximum angle of inclination (for example, 30° at which the inclined angle of the vehicle is maximum, at the time of driving on an actual sloping ground. Note that an upper limit of the angle θ of the straight line L from the horizontal line is preferably set to a value less than 90°.

Figure 5A:
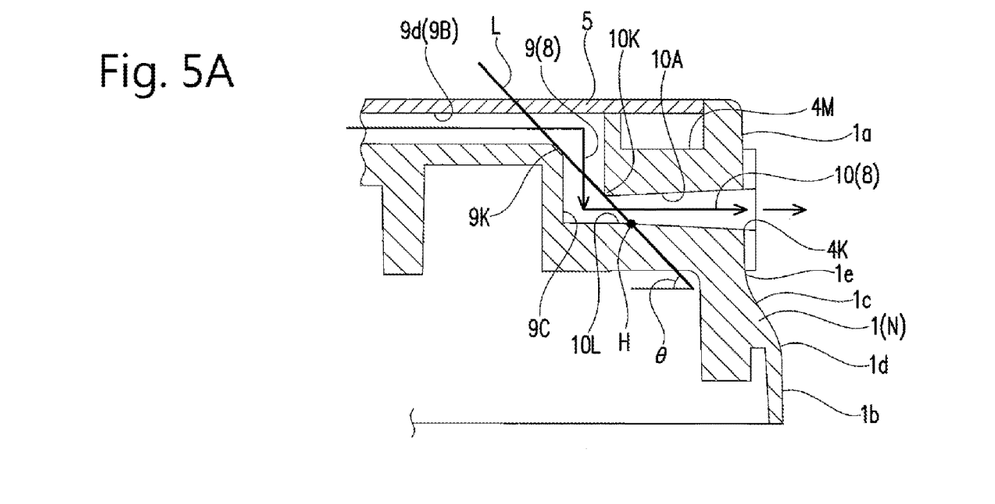

In addition, as illustrated in FIG. 5A, the third guide portion 10A is formed so that a bottom wall 10L constituting the third guide portion 10A is present on an extended line of the straight line L (straight line L having internal contact with the two corner portions 9K and 10K) extending toward the third guide portion 10A side. This will be described specifically. Here, an intersecting point at which the extended line of the straight line L extending toward the third guide portion 10A side intersects with the bottom wall 10L of the third guide portion 10A is defined as H. When the end of the bottom wall 10L forming the exhaust vent 4K thereof is located closer to the second guide portion 9C side (left side in FIG. 5A) than the intersecting point H is, the guide path 10 cannot be placed in state of being shut off by muddy water S at a location of the guide path 10 from the first guide portion 9B to the third guide portion 10A, as will be described later. Accordingly, the third guide portion 10A is formed so that the end of the bottom wall 10L is located on the right of the intersecting point H in FIG. 5A.

Figure 5B:
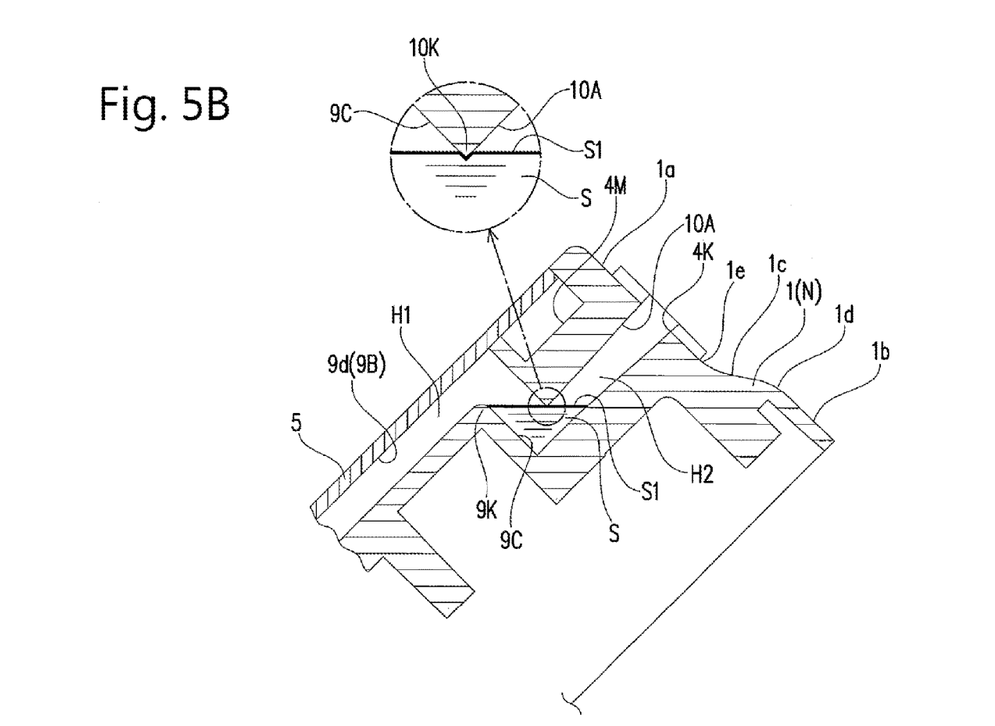

In addition, as described above, the angle θ of the straight line L from the horizontal line is set to 45°, which is greater than the limited angle of inclination of the vehicle body. Accordingly, even if splashed muddy water intrudes into the guide path 10 from the exhaust vent 4K while, for example, a vehicle (irregular-terrain four-wheel vehicle) is driving along a rough road with puddles of muddy water, temporarily or during a predetermined time, in a state of being inclined at the limited angle of inclination, the vehicular lead storage battery can be placed in a state of not allowing the muddy water to get inside through the first guide portion 9B. That is, as illustrated in FIG. 5B, a surface (liquid level) S1 of the muddy water S coming in from the third guide portion 10A is placed in a state of having internal contact with the two corner portions 9K and 10K (the corner portion 9K inside a corner formed by the first guide portion 9B and the second guide portion 9C and the corner portion 10K inside a corner formed by the second guide portion 9C and the third guide portion 10A). That is, the horizontalized liquid level S1 of the muddy water S is placed in a state of running through the two corner portions 9K and 10K. Consequently, the guide path 10 is placed in a state of being shut off by the muddy water S at a location thereof from the first guide portion 9B to the third guide portion 10A. That is, a space H1 on the first guide portion 9B side and a space H2 on the third guide portion 10A side open to the outside are placed in a state of being completely shut off from each other. Thus, the space H1 on the first guide portion 9B side is placed in a state of being shut off from the third guide portion 10A side. This condition makes it difficult for air and the muddy water S to replace each other (the muddy water S does not move from the second guide portion 9C to the first guide portion 9B) in the space H1. This shutoff state can be maintained until the straight line L (liquid level S1 of the muddy water) becomes level or horizontal (until the inclined angle of the vehicular lead storage battery reaches 45°). As has been described heretofore, it is possible to prevent the muddy water from getting inside the battery even if the vehicle drives with the vehicle body inclined at the limited angle of inclination.

In addition, the angle θ of the straight line L from the horizontal line is set to 45°, which is greater than the limited angle of inclination. Consequently, the range over which the two corner portions 9K and 10K (the corner portion 9K inside a corner formed by the first guide portion 9B and the second guide portion 9C and the corner portion 10K inside a corner formed by the second guide portion 9C and the third guide portion 10A) projectively overlap with each other is widened, and therefore, the guide path of the second guide portion 9C is lengthened. Accordingly, the path of the second guide portion 9C itself retains the muddy water when the amount of incoming muddy water is small, and can thus prevent the muddy water from intruding inside.

For reference's sake, the pressure of the space H1 on the first guide portion 9B side is set higher than the pressure of outside air communicated with the outer side of the third guide portion 10A by the pressure of gases generated within cell chambers. Thus, the shutoff state is not cancelled at any time soon. Consequently, even if an amount of muddy water larger than the amount of muddy water S in FIG. 5B comes in, the shutoff state is maintained with the third guide portion 10A retaining the muddy water, thereby further preventing the muddy water from advancing from the second guide portion 9C toward the first guide portion 9B side.

Accordingly, the intrusion of muddy water into the first guide portion 9B side can be prevented, irrespective of the amount of incoming muddy water.

As illustrated in the enlarged view of FIG. 5B, the space H1 on the first guide portion 9B side can be reliably shut off as long as the surface S1 of the muddy water S has internal contact with the corner portion 9K formed by the first guide portion 9B and the second guide portion 9C and the corner portion 10K formed by the second guide portion 9C and the third guide portion 10A (the surface S1 runs through the two corner portions 9K and 10K).

Here, the third guide portion 10A is formed into a taper shape in which the third guide portion 10A decreases in diameter in proportion to the distance thereof from the exhaust vent 4K. Accordingly, the end of the third guide portion 10A on the opposite side of the exhaust vent 4K has the minimum cross-sectional area. As the result of the third guide portion 10A being formed into a taper shape in which the third guide portion 10A decreases in diameter in proportion to the distance thereof from the exhaust vent 4K, as described above, it is possible to make muddy water or the like easy to discharge out of the exhaust vent 4K, even if the muddy water or the like comes in from the exhaust vent 4K. This configuration can further contribute to enhancing watertight effects.

Note that the third guide portion 10A may be the same in diameter from the starting end to the terminal end (exhaust vent 4K) thereof in the direction of guiding gases. In this case, the third guide portion 10A has the minimum cross-sectional area across the entire length thereof. Alternatively, the third guide portion 10A may be formed so as to have the minimum cross-sectional area only in part. The position or predetermined region of the minimum cross-sectional area in this case is set to the leading portion or the terminal portion (exhaust vent 4K) of the third guide portion 10A in the direction of guiding gases, or to any position or any predetermined region from the leading portion to the terminal portion. Note that the cross-sectional shapes of the third guide portion 10A, the second guide portion 9C, and the first guide portion 9B may be any shapes, including an elliptical shape and a rectangular shape, in addition to a circular shape.

Figure 6A:
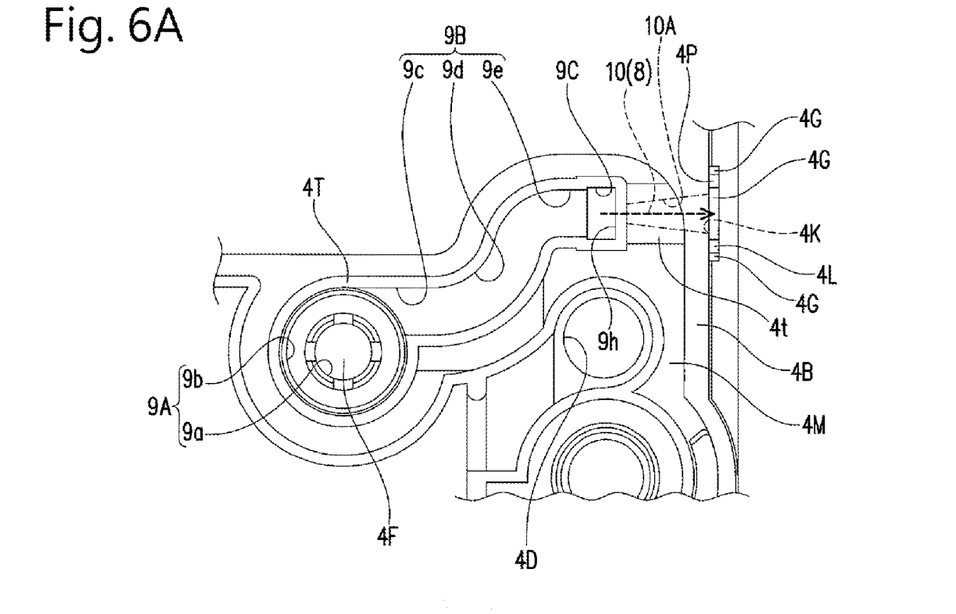
Figure 6B:
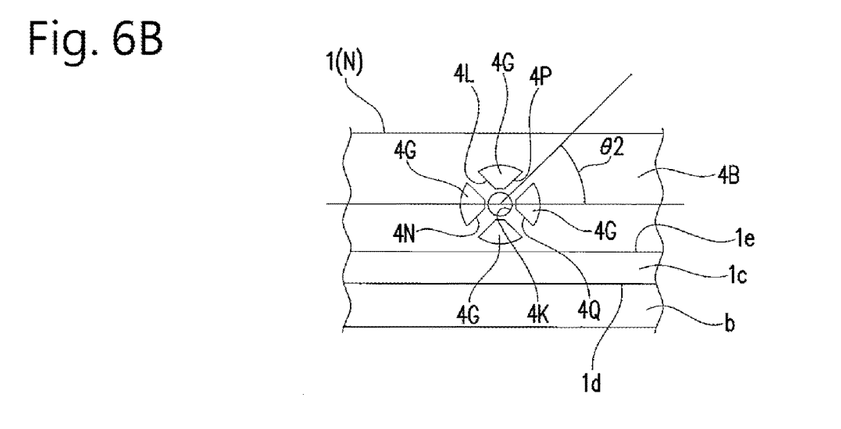
FIG. 6B is a front view of the exhaust vent.

As illustrated in FIGS. 6A and 6B, the exhaust vent 4K is provided with four arciform band plate-like protrusions 4G projecting from an external surface of the vertical wall 4B constituting the cover plate 1, and four cutouts 4L, 4N, 4P and 4Q, each being formed between protrusions 4G adjacent to each other in the circumferential direction of the exhaust vent 4K toward the radial direction thereof by radially arranging these protrusions 4G in the circumferential direction at predetermined intervals (equal spaces). This configuration causes gases discharged from the exhaust vent 4K to pass through the cutouts 4L, 4N, 4P and 4Q and be discharged in the radial direction (direction of protrusion) of the protrusions 4G. Accordingly, these protrusions 4G and cutouts 4L, 4N, 4P and 4Q can prevent the exhaust vent 4K from being directly clogged, even if any foreign matter is present in the vicinity of the exhaust vent 4K. The four cutouts are communicated with the exhaust vent 4K and arranged at equal spaces in the circumferential direction. Note that the number and width of the cutouts 4L, 4N, 4P and 4Q can be varied freely. In addition, the cutouts may be formed by denting the surface of the vertical wall 4B, without providing the protrusions 4G. In FIG. 6B, the angle $\theta 2$ of each cutout (for example, the cutout 4P) from the horizontal line is set to the same angle as the angle $\theta$ of the straight line L from the horizontal line.

As the result of the cutouts 4L, 4N, 4P and 4Q being oriented in the direction of inclination as described above, the cutouts do not face directly upward with the battery mounted, no matter whether the battery is placed in an upright position or a lateral position. Accordingly, it is possible to further prevent muddy water or the like from intruding from the cutouts 4L, 4N, 4P and 4Q.

As illustrated in FIGS. 5A, 5B and 6B, a side surface 1$b$ below the exhaust vent 4K in the cover plate 1 swells outward from a side surface 1$a$ including the exhaust vent 4K. In addition, the cover plate 1 includes a continuous inclined surface 1$c$ between an upper end portion 1$d$ of the swelled side surface 1$b$ and a lower end portion 1$e$ of the side surface 1$a$ in which the exhaust vent 4K is formed. In this way, a portion of the cover plate 1 below the exhaust vent 4K gradually inclines outward as the portion comes closer to the lower part of the cover plate 1 while forming a gently curved surface, thereby eliminating any steps which may otherwise be formed (preventing any steps from being formed) below the exhaust vent 4K. Consequently, it is possible to make dirt or the like less likely to adhere to the side surface 1$c$ of the cover plate 1 in the vicinity of the exhaust vent 4K. Thus, the exhaust vent can be maintained in a favorable condition. Here, the entire range of the inclined surface 1$c$ is formed into a curved surface in the vertical direction. Alternatively, however, the upper end and lower end portions of the inclined surface 1$c$ may be formed into curved surfaces, and an intermediate portion between the upper and lower end portions of the inclined surface 1$c$ may be formed into a planiform surface (flat surface). The point is that the inclined surface may have any shapes as long as no steps are formed on the side surface of the cover plate 1.

Figure 7A:
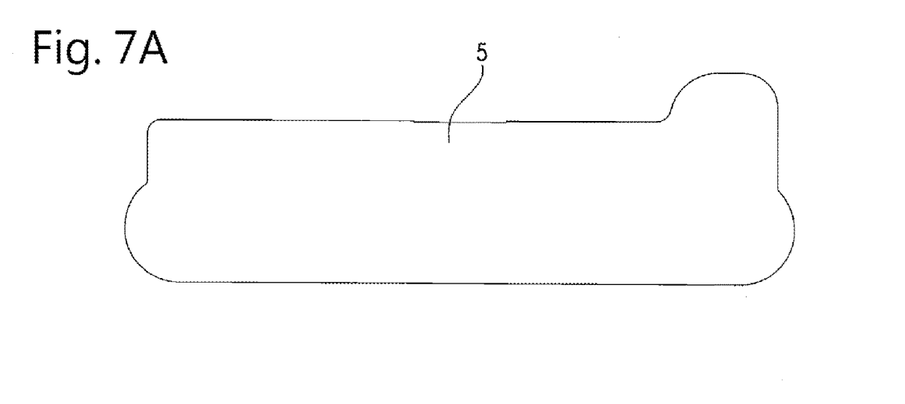
Figure 7B:
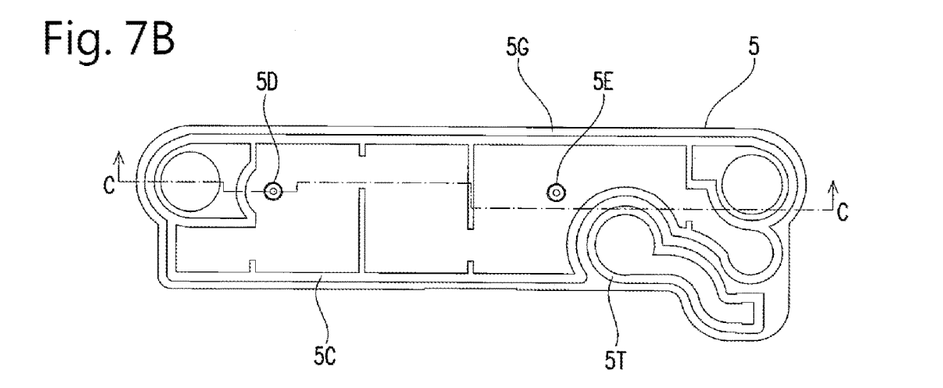
Figure 7C:
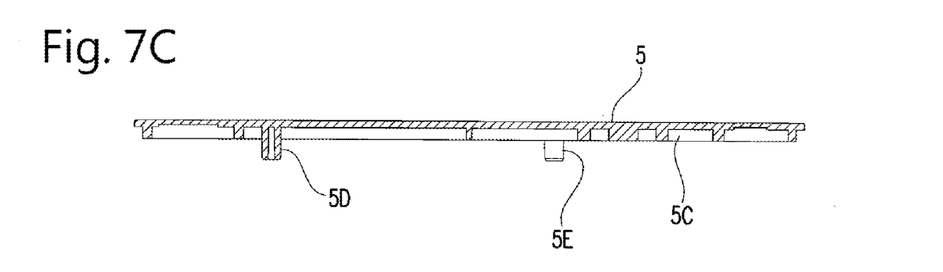

The upper cover 5 is provided with locking portions to be locked into locking holes 11 and 12 (see FIG. 2) formed on the cover plate 1 side, in order to perform positioning at the time of attaching the upper cover 5 to the cover plate 1. The locking portions project downward from the lower surface of the upper cover 5, as illustrated in FIGS. 7B and 7C. The locking portions are composed of a pair of cylindrical bodies 5D and 5E having a cylindrical shape circular and hollow in cross-sectional shape (may alternatively be a solid-core rod-like shape). The pair of cylindrical bodies 5D and 5E aligns on the right and left sides in the figure. Note that one locking hole 11 is formed into an oblong hole (extending in the right-left direction of the figure), and the other locking hole 12 is formed into a circular shape.

Note that the present invention is not limited to the above-described embodiment, but may be modified in various other ways without departing from the gist of the invention.

In the above-described embodiment, the guide path 8 includes the upward guide portion 9A. The embodiment is not limited to this configuration, however. For example, the guide path 8 may exclude the upward guide portion 9A, and the second exhaust opening 4F may be provided on the lower surface of the starting end of the first guide portion 9B in the guiding direction.

In addition, in the above-described embodiment, the first guide path 9 (the first guide portion 9B thereof) is formed by the cover plate and the upper cover integrated with each other by fusion (not limited to fusion but may be by means of, for example, an adhesive agent). The embodiment is not limited to this configuration, however. The first guide path 9 (first guide portion 9B thereof) may be formed on the cover plate 1 side as the second guide path 10.

Yet additionally, in the above-described embodiment, the guide path 8 is formed so as to discharge gases from one side of a direction in which the long sides of the cover plate 1 extend (right-side end in the figure). The embodiment is not limited to this configuration, however. For example, the guide path 8 may be formed so as to discharge the gases from the other side of the direction in which the long sides of the cover plate 1 extend (left-side end in the figure). Alternatively, the guide path 8 may be formed so as to discharge the gases from one side of the short side direction of the cover plate 1 (front-side end) or from the other side of the short side direction of the cover plate 1 (rear-side end).

Further, the vehicular lead storage battery 1 of the above-described embodiment includes the space for collecting gases discharged from the exhaust openings 4D of the respective cell chambers in a specific cell chamber, and the guide path 8 for guiding the gases collected in the space to the outside through the second exhaust opening 4F. The embodiment is not limited to this configuration, however. For example, the recessed portion 4 of the cover plate 1 as a whole can be made to serve as a guide path.

Further, in the above-described embodiment, the battery container includes a plurality of cell chambers. The embodiment is not limited to this configuration, however. For example, the battery container may include only one cell chamber. In this case, the exhaust opening for discharging gases from the cell chamber to the outside is arranged while being communicated with the guide path.

REFERENCE SIGNS LIST

1: cover plate, 1A: first cover portion, 1B: second cover portion, 1F: flat surface, 1a, 1b: side surface, 1c: inclined surface, 1d: upper end portion, 1e: lower end portion, 2, 3: terminal, 4: recessed portion, 4A: bottom wall, 4B: vertical wall, 4C, 4T: projecting portion, 4D: exhaust opening, 4E: extending portion, 4F: second exhaust opening, 4G: protrusion, 4K: exhaust vent, 4M: groove portion, 4W: curved section, 4t: projecting portion, 5: upper cover, 5C, 5T: junctional portion, 5D, 5E: cylindrical body, 5G: outer periphery, 6, 7: bushing, 8: guide path, 9: first guide path, 10: second guide path, 9A: upward guide portion, 9B: first guide portion, 9C: second guide portion, 9K, 10K: corner portion, 9a, 9b: upward guide portion, 9c: first-direction guide portion, 9d: curved guide portion, 9e: second-direction guide portion, 9h: wall, 10A: third guide portion, 11, 12: locking hole, 20: front wheel, 21: rear wheel, 22: body frame, 23: engine, 24: sheet, 25: upper frame, 26: housing box, H1, H2: space, L: straight line, N: vehicular lead storage battery, S: muddy water, S1: surface, θ: angle

The invention claimed is:

1. A vehicular lead storage battery comprising:
   a battery container in which an upper opening is formed and which is provided with at least one cell chamber; and
   a cover plate in which an exhaust vent is formed and which covers the upper opening of the battery container,
   wherein a guide path for discharging gases inside the cell chamber to the outside is formed in the cover plate, the guide path including:
   a first guide portion for horizontally guiding gases from the cell chamber;
   a second guide portion connected to the first guide portion to downwardly guide the gases from the first guide portion; and
   a third guide portion connected to the second guide portion to horizontally guide the gases from the second guide portion and discharge the gases from an exhaust vent to the outside,
   a corner portion is formed by the first guide portion and the second guide portion,
   another corner portion is formed by the second guide portion and the third guide portion,
   the guide path is formed so that the angle of a straight line having internal contact with the two corner portions from a horizontal line is greater than 30° and less than 90°, and
   the third guide portion is formed into a taper shape in which the third guide portion decreases in diameter as the distance thereof from the exhaust vent increases.

* * * * *